(12) United States Patent
Abrishamkar et al.

(10) Patent No.: US 7,929,652 B2
(45) Date of Patent: Apr. 19, 2011

(54) ADAPTIVE PILOT AND DATA SYMBOL ESTIMATION

(75) Inventors: Farrokh Abrishamkar, San Diego, CA (US); Mariam Motamed, Redwood City, CA (US); Parvathanathan Subrahmanya, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 979 days.

(21) Appl. No.: 11/733,646

(22) Filed: Apr. 10, 2007

(65) Prior Publication Data

US 2008/0253487 A1 Oct. 16, 2008

(51) Int. Cl.
*H03D 1/04* (2006.01)
*H03K 9/00* (2006.01)

(52) U.S. Cl. .................................... 375/346; 375/316
(58) Field of Classification Search .................. 375/346, 375/316
See application file for complete search history.

(56) References Cited

U.S. PATENT DOCUMENTS

| | | | |
|---|---|---|---|
| 6,690,944 B1 * | 2/2004 | Lee et al. | 455/522 |
| 6,868,276 B2 | 3/2005 | Nissila | |
| 7,061,882 B2 | 6/2006 | Abrishamkar et al. | |
| 2004/0062217 A1 * | 4/2004 | Abrishamkar et al. | 370/320 |
| 2004/0259514 A1 * | 12/2004 | Nissila | 455/226.1 |
| 2005/0013369 A1 * | 1/2005 | Lee | 375/240.16 |
| 2006/0182343 A1 * | 8/2006 | Lin et al. | 382/181 |
| 2007/0110201 A1 * | 5/2007 | Mergen et al. | 375/350 |
| 2008/0130795 A1 * | 6/2008 | Chang et al. | 375/329 |

FOREIGN PATENT DOCUMENTS

| | | |
|---|---|---|
| WO | 03105376 | 12/2003 |
| WO | 2004038947 | 5/2004 |

OTHER PUBLICATIONS

International Search Report, PCT/US08/059750, International Searching Authority, European Patent Office, Dec. 23, 2008.
Written Opinion, PCT/US08/059750, International Searching Authority, European Patent Officem Dec. 23, 2008.
Bohn et al., "Sensitivity models for nonlinear filters with application to recursive parameter estimation for nonlinear state-space models," IEE Proceedings D. Control Theory & Applications, Mar. 21, 2001, pp. 137-145, vol. 148, No. 2, Institution of Electrical Engineers, Stevenage, GB, XP006016576.

* cited by examiner

*Primary Examiner* — David C Payne
*Assistant Examiner* — Brian J Stevens

(57) ABSTRACT

Techniques for performing adaptive channel estimation are described. A receiver derives channel estimates for a wireless channel based on received pilot symbols and at least one estimation parameter. The receiver updates the at least one estimation parameter based on the received pilot symbols. The at least one estimation parameter may be for an innovations representation model of the wireless channel and may be updated based on a cost function with costs defined by prediction errors. In one design, the receiver derives predicted pilot symbols based on the received pilot symbols and the at least one estimation parameter, determines prediction errors based on the received pilot symbols and the predicted pilot symbols, and further derives error gradients based on the prediction errors. The receiver then updates the at least one estimation parameter based on the error gradients and the prediction errors, e.g., if a stability test is satisfied.

18 Claims, 5 Drawing Sheets

ADAPTIVE PILOT AND DATA SYMBOL ESTIMATION

BACKGROUND

I. Field

The present disclosure relates generally to communication, and more specifically to estimation techniques for wireless communication.

II. Background

In a wireless communication system, a transmitter typically processes (e.g., encodes and modulates) traffic data to generate data symbols. For a coherent system, the transmitter multiplexes pilot symbols with the data symbols, processes the multiplexed data and pilot symbols to generate a radio frequency (RF) signal, and transmits the RF signal via a wireless channel. The wireless channel distorts the transmitted RF signal with a channel response and further degrades the signal with noise and interference.

A receiver receives the transmitted RF signal and processes the received RF signal to obtain samples. For coherent data detection, the receiver estimates the response of the wireless channel based on the received pilot symbols and derives channel estimates. The receiver then performs data detection (e.g., equalization) on the samples with the channel estimates to obtain data symbol estimates, which are estimates of the data symbols sent by the transmitter. The receiver then processes (e.g., demodulates and decodes) the data symbol estimates to obtain decoded data.

The quality of the channel estimates may have a large impact on data detection performance and may affect the quality of the data symbol estimates as well as the reliability of the decoded data. Thus, it is desirable to derive high quality channel estimates. Channel estimation is challenging if the wireless channel conditions can change over time. For example, the wireless channel may be relatively static at one moment and rapidly changing at another moment, e.g., due to mobility of the transmitter and/or the receiver. A channel estimation scheme that can provide good channel estimates for certain channel conditions (e.g., a static channel) may not work well for other channel conditions (e.g., a rapidly changing channel).

There is therefore a need in the art for techniques to derive high quality channel estimates under different channel conditions.

SUMMARY

Techniques for performing adaptive estimation for pilot and data symbols are described herein. The techniques may be used to estimate pilot symbols, which may in turn be used to derive channel estimates for a wireless channel.

In an aspect, a receiver derives channel estimates for a wireless channel based on received pilot symbols and at least one estimation parameter. The receiver adaptively updates the at least one estimation parameter based on the received pilot symbols. The at least one estimation parameter may be for an innovations representation (IR) model of the wireless channel and may be updated based on a cost function with costs defined by prediction errors. The cost function may give exponentially decaying weights to costs for progressively older symbol periods. The at least one estimation parameter may be updated using gradient descent, e.g., based on the gradient of the cost function.

In one design for updating the at least one estimation parameter, the receiver derives predicted pilot symbols based on the received pilot symbols and the at least one estimation parameter. The receiver determines prediction errors based on the received pilot symbols and the predicted pilot symbols and further derives error gradients based on the prediction errors. The receiver then updates the at least one estimation parameter based on the error gradients and the prediction errors, e.g., if a stability test is satisfied. The receiver may use the predicted pilot symbols as the channel estimates or may derive the channel estimates based on the predicted pilot symbols and the at least one estimation parameter.

Various aspects and features of the disclosure are described in further detail below.

DETAILED DESCRIPTION

The adaptive estimation techniques described herein may be used for various communication systems and networks such as cellular systems, broadcast systems, wireless local area networks (WLANs), etc. The terms "network" and "system" are often used interchangeably. For example, the techniques may be used for Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. A CDMA system may implement a radio technology such as Wideband-CDMA (W-CDMA), cdma2000, etc. cdma2000 covers IS-2000, IS-856 and IS-95 standards. A TDMA system may implement a radio technology such as Global System for Mobile Communications (GSM), Digital Advanced Mobile Phone System (D-AMPS), etc. These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. An OFDMA system uses Orthogonal Frequency Division Multiplexing (OFDM), which transmits modulation symbols in the frequency domain on orthogonal subcarriers. An SC-FDMA system uses Single-Carrier Frequency Division Multiplexing (SC-FDM), which transmits modulation symbols in the time domain on orthogonal subcarriers.

Figure 1:
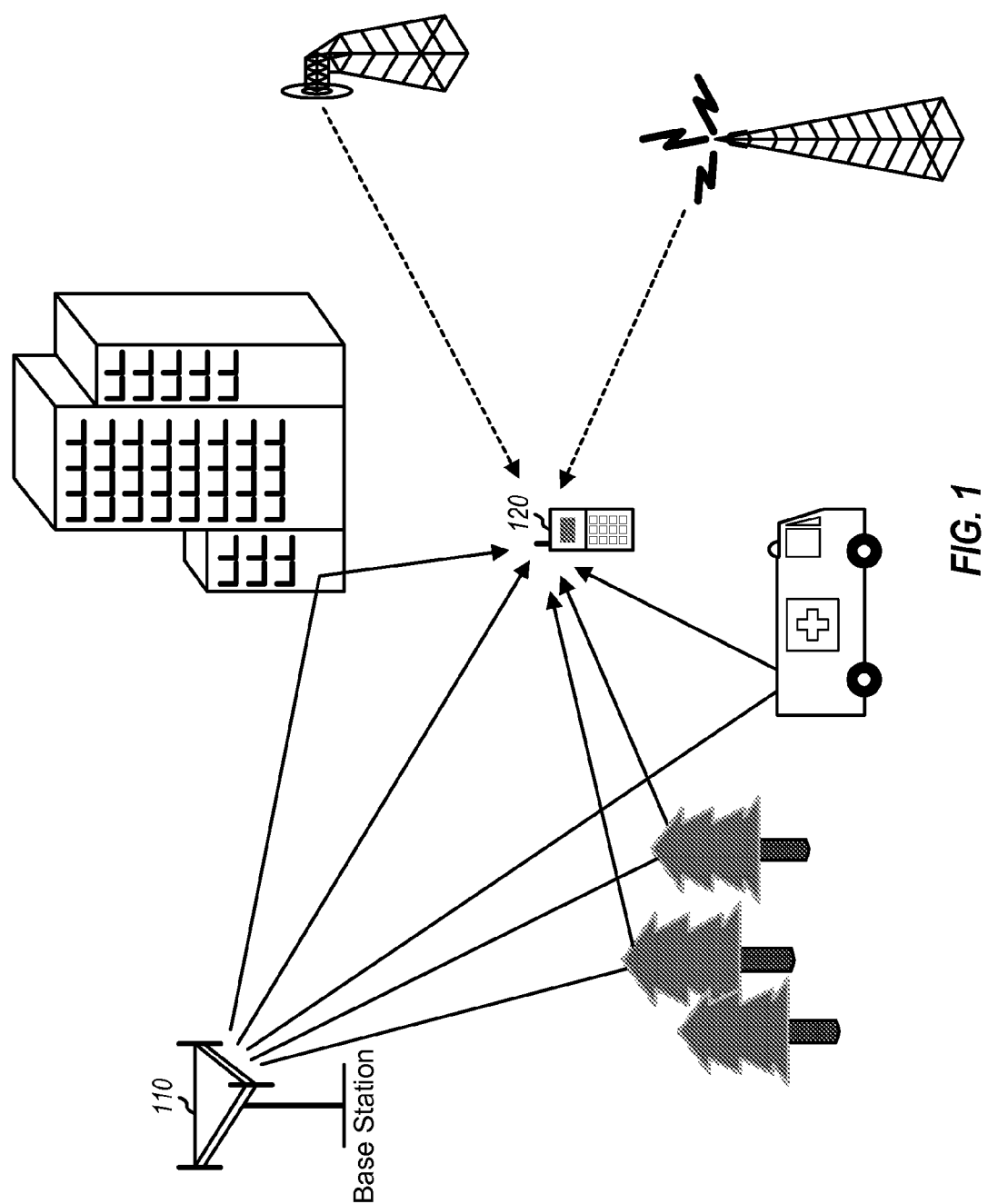
FIG. 1 shows an example transmission in a wireless communication system.

FIG. 1 shows an example transmission in a wireless communication system. For simplicity, FIG. 1 shows only one base station 110 and one wireless device 120. A base station is generally a fixed station that communicates with the wireless devices and may also be called a Node B, an access point, a base transceiver station (BTS), etc. A wireless device may be stationary or mobile and may also be called a user equipment, a mobile station, a terminal, a subscriber unit, a station, etc. A wireless device may be a cellular phone, a personal digital assistant (PDA), a wireless modem, a handheld device, a laptop computer, etc.

Base station 110 transmits an RF signal to wireless device 120. This RF signal may reach wireless device 120 via one or more signal paths, which may include a direct path and/or reflected paths. The reflected paths are created by reflections of radio waves due to obstructions (e.g., buildings, trees, vehicles, and other structures) in the wireless environment. The signal paths may be relatively static (e.g., when wireless device 120 is stationary) or may change rapidly (e.g., when wireless device 120 is mobile). Wireless device 120 may receive multiple instances or copies of the transmitted RF signal. Each received signal instance is obtained via a different signal path and has a particular complex gain and a particular propagation delay determined by that signal path. The received RF signal at wireless device 120 is a superposition of all received signal instances. Wireless device 120 may also receive interfering transmissions from other transmitting stations, which are shown by dashed lines in FIG. 1.

Figure 2:
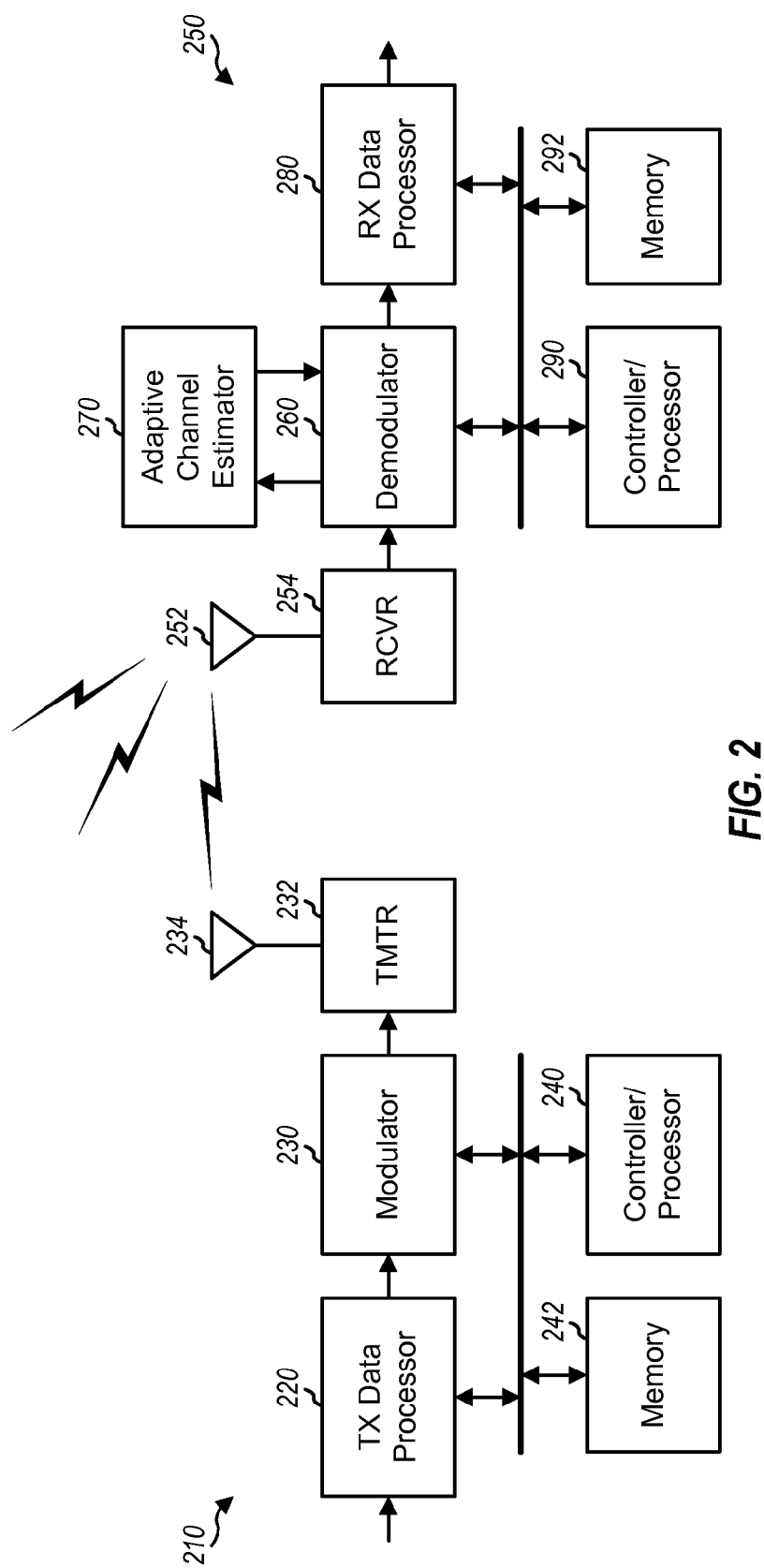
FIG. 2 shows a block diagram of a transmitter and a receiver.

FIG. 2 shows a block diagram of a transmitter 210 and a receiver 250. For downlink (or forward link) transmission, transmitter 210 may be part of base station 110, and receiver 250 may be part of wireless device 120. For uplink (or reverse link) transmission, transmitter 210 may be part of wireless device 110, and receiver 250 may be part of base station 120. The adaptive estimation techniques described herein may be performed by receiver 250 and may thus be used for wireless devices as well as base stations.

At transmitter 210, a transmit (TX) data processor 220 processes (e.g., encodes, interleaves, and symbol maps) traffic data and generates data symbols. As used herein, a data symbol is a modulation symbol for data, a pilot symbol is a modulation symbol for pilot, a modulation symbol is a complex value for a point in a signal constellation (e.g., for PSK or QAM), and pilot is data that is known a priori by both the transmitter and receiver. A modulator 230 processes the data symbols and pilot symbols (e.g., for CDMA, OFDM, etc.) and provides output chips to a transmitter unit (TMTR) 232. For CDMA, modulator 230 may spread the data and pilot symbols with different channelization codes (e.g., Walsh codes or OVSF codes), scale the spread symbols for different code channels with appropriate gains, combine the scaled symbols, and scramble the combined symbols with a scrambling code to obtain the output chips. For OFDM, modulator 230 may perform an inverse fast Fourier transform (IFFT) on the data and pilot symbols for each OFDM symbol period to obtain a sequence of time-domain chips and append a cyclic prefix to the chip sequence to obtain an OFDM symbol. In any case, transmitter unit 232 processes (e.g., converts to analog, amplifies, filters, and frequency upconverts) the output chips from modulator 230 and generates an RF signal, which is transmitted via an antenna 234.

At receiver 250, an antenna 252 receives the transmitted RF signal via direct and/or reflected paths and provides a received RF signal to a receiver unit (RCVR) 254. Receiver unit 254 processes (e.g., filters, amplifies, frequency downconverts, and digitizes) the received RF signal and provides received samples. Receiver unit 254 may also perform processing for automatic gain control (AGC), frequency correction, digital filtering, sample rate conversion, etc. A demodulator (Demod) 260 processes the received samples in a manner complementary to the processing by modulator 230 to obtain received data and pilot symbols. For CDMA, demodulator 260 may descramble the received samples with a descrambling code and despread the descrambled samples with different channelization codes to obtain the received pilot and data symbols. For OFDM, demodulator 260 may remove the cyclic prefix in each OFDM symbol and perform a fast Fourier transform (FFT) on the received samples after cyclic prefix removal to obtain the received pilot and data symbols.

An adaptive channel estimator 270 derives channel estimates for the wireless channel between transmitter 210 and receiver 250 based on the received pilot symbols and/or the received data symbols, as described below. Demodulator 260 then processes the received data symbols with the channel estimates and provides data symbol estimates. For CDMA, demodulator 260 may perform maximal ratio combining of the received data symbols for different signal paths based on the channel estimates. For both CDMA and OFDM, demodulator 260 may perform equalization, matched filtering, etc., on the received data symbols with the channel estimates to obtain the data symbol estimates. In any case, a receive (RX) data processor 280 then processes (e.g., symbol demaps, deinterleaves, and decodes) the data symbol estimates and provides decoded data. In general, the processing by demodulator 260 and RX data processor 280 at receiver 250 is complementary to the processing by modulator 230 and TX data processor 220, respectively, at transmitter 210.

Controllers/processors 240 and 290 direct operation of various processing units at transmitter 210 and receiver 250, respectively. Memories 242 and 292 store data and program codes for transmitter 210 and receiver 250, respectively.

Receiver 250 may estimate transmitted symbols based on received symbols. As an example, receiver 250 may estimate transmitted pilot symbols based on the received pilot symbols and then estimate the response of the wireless channel based on the estimated pilot symbols. Channel estimation based on the received pilot symbols is described below.

The received pilot symbols may be expressed as:

$$y_k = s_k + v_k, \quad \text{Eq (1)}$$

$$s_k = \rho_k \cdot e^{j\varphi_k} \cdot R_{hh}(\tau) = g_k \cdot N \cdot \sqrt{E_c^p} \cdot R_{hh}(\tau) \cdot f_k, \text{ and} \quad \text{Eq (2)}$$

$$v_k = g_k \cdot \sqrt{N \cdot I_{oc}} \cdot n_k + g_k \cdot \sqrt{N \cdot I_{or}} \cdot \sum_{\substack{m=-\infty \\ m \neq k}}^{+\infty} R_{hh}(t \cdot T_C - \tau) \cdot w_k, \quad \text{Eq (3)}$$

where $y_k$ is a received pilot symbol in symbol period k, $s_k$ is a transmitted pilot symbol in symbol period k, $v_k$ is total noise and interference observed in symbol period k, $\rho_k$ is Rice (Rayleigh) fade process in symbol period k, $\phi_k$ is fading phase in symbol period k, $R_{hh}(\tau)$ is correlation for a transmit filter convolved with itself at time offset $\tau$.

$g_k$ is AGC gain at the receiver in symbol period k,

N is processing gain, which may correspond to the channelization code length, $E_c^p$ is energy-per-chip for the pilot symbols, $f_k$ is complex Gaussian fade process with Clark spectrum in symbol period k, $I_{oc}$ is total additive white Gaussian noise (AWGN) at the receiver, $I_{or}$ is total transmit power spectral density (PSD), $n_k$ and $w_k$ are zero mean unit power Gaussian noise in symbol period k, and k is symbol period index, t is chip period index, and $T_C$ is one chip period.

Wold decomposition may be used to expand the received pilot symbol in symbol period k in terms of its innovation sequence, as follows:

$$y_k = a_1 \cdot y_{k-1} + a_2 \cdot y_{k-2} + \ldots + a_n \cdot y_{k-n} + e_k - d_1 \cdot e_{k-1} - d_2 \cdot e_{k-2} - \ldots - d_m \cdot e_{k-m}, \quad \text{Eq (4)}$$

where $e_k$ is the innovation sequence associated with the stationary process $y_k$ or prediction error sequence, and
$a_i$ and $d_i$ are real valued coefficients of the Wold decomposition.

In the innovation representation (IR) model shown in equation (4), the current received pilot symbol $y_k$ is expressed based on prior received pilot symbols $y_{k-i}$ and innovations $e_{k-j}$.

A predicted value $\hat{y}_k$ and a predicted pilot symbol $\hat{s}_k$ for symbol period k may be expressed as:

$$\hat{y}_k = \hat{y}_{k|k-1} = E(y_k | \underline{Y}_{k-1}) = E(s_k | \underline{Y}_{k-1}) = \hat{s}_{k|k-1} = \hat{s}_k, \quad \text{Eq (5)}$$

where $\hat{y}_{k|k-1}$ denotes a predicted value for symbol period k based on received pilot symbols in symbol period k−1 and earlier,
$E(y_k | \underline{Y}_{k-1})$ denotes an expectation for received pilot symbol $y_k$ based on received pilot symbols in symbol period k−1 and earlier,
$\hat{s}_{k|k-1}$ denotes a predicted pilot symbol for symbol period k based on received pilot symbols in symbol period k−1 and earlier, and
$E(s_k | \underline{Y}_{k-1})$ denotes an expectation for transmitted pilot symbol $s_k$ based on received pilot symbols in symbol period k−1 and earlier.

The prediction error $e_k$ may be defined as:

$$e_k = y_k - \hat{y}_k. \quad \text{Eq (6)}$$

Combining equations (4) and (6), the predicted value $\hat{y}_k$ may be expressed as:

$$\hat{y}_k = a_1 \cdot \hat{y}_{k-1} + a_2 \cdot \hat{y}_{k-2} + \ldots + a_n \cdot \hat{y}_{k-n} + L_1 \cdot e_{k-1} + L_2 \cdot e_{k-2} + \ldots + L_m \cdot e_{k-m}, \quad \text{Eq (7)}$$

where $L_i = a_i - d_i$.

A predicted value $\hat{y}_{k-1}$ for symbol period k+1 may be obtained with a first-order predictor by using a first order approximation to equation (7), as follows:

$$\hat{y}_{k+1} = a \cdot \hat{y}_k + L \cdot e_k = [\hat{y}_k \; e_k] \cdot \begin{bmatrix} a \\ L \end{bmatrix}, \quad \text{Eq (8)}$$

where a and L are parameters of the prediction recursion in equation (8) and are referred to as estimation parameters.

In an aspect, the estimation parameters are updated in an adaptive manner. The prediction error may be used for updating the estimation parameters and may be defined as a function of the estimation parameters, as follows:

$$e_k(\theta_k) = y_k - \hat{y}_k(\theta_k) = y_k - \hat{s}_k(\theta_k), \quad \text{Eq (9)}$$

where $\theta_k = [a_{k-1} L_{k-1}]^T$ is a vector of the estimation parameters for symbol period k,
"T" denotes a transpose,
$\hat{y}_k(\theta_k)$ denotes a predicted value as a function of $\theta_k$,
$\hat{s}_k(\theta_k)$ denotes a predicted pilot symbol as a function of $\theta_k$, and
$e_k(\theta_k)$ denotes a prediction error as a function of $\theta_k$.

The estimation parameters may be updated based on a cost function. In one design, the cost function is defined as follows:

$$\Lambda_k(\theta_k) = \frac{1}{\gamma_k} \cdot \sum_{l=1}^{k} \lambda^{k-l} \cdot e_l^2(\theta_l), \quad \text{Eq (10)}$$

where $e_l^2(\theta_l)$ is the cost for symbol period l,
 $0 < \lambda < 1$ is a weighting factor for the costs for different symbol periods,
 $\gamma_k = \lambda^k + \lambda^{k-1} + \ldots + 1$ is a normalization factor, and
 $\Lambda_k(\theta_k)$ denotes the cost function, which is a function of $\theta_k$.

In equation (10), $\Lambda_k(\theta_k)$ is obtained by (a) computing the cost for each symbol period as $e_l^2(\theta_l)$, (b) weighting the cost for each symbol period with $\lambda^{k-l}$, (c) summing the weighted costs for all symbol periods, and (d) dividing the summed result by the normalization factor. Equation (10) weighs the costs for different symbol periods with an exponentially decaying function $\lambda^{k-l}$. Thus, the cost for symbol period k has a weight of 1, the cost for symbol period k−1 has a weight of $\lambda$, the cost for symbol period k−2 has a weight of $\lambda^2$, etc. Equation (10) gives more weight to the costs for more recent symbol periods and less weight to the costs for earlier symbol periods. The older costs may be given more weight with a larger $\lambda$ and less weight with a smaller $\lambda$. The summation in equation (10) is across all symbol periods in which prediction errors are available for updating the estimation parameters. Equation (10) represents one example cost function. Other cost functions may also be used to update the estimation parameters.

The transmitted pilot symbol $s_k$ in symbol period k may be predicted during symbol period k−1, as follows:

$$\hat{s}_k = [\hat{s}_{k-1} \; e_{k-1}] \cdot \begin{bmatrix} a_{k-1} \\ L_{k-1} \end{bmatrix} = \phi_k(\theta_k) \cdot \theta_k, \quad \text{Eq (11)}$$

where $\phi_k(\theta_k) = [\hat{s}_{k-1} e_{k-1}]$ is a vector containing predicted pilot symbol $\hat{s}_{k-1}$ and prediction error $e_{k-1}$ for symbol period k−1.

The estimation parameters may be solved for using various techniques. In one design, the estimation parameters are determined using gradient descent and may be expressed as:

$$\hat{\theta}_{k+1} = \hat{\theta}_k - \mu \cdot \nabla_\theta \Lambda_k(\theta_k), \quad \text{Eq (12)}$$

where $$\nabla_\theta \Lambda_k(\theta_k) = \frac{\partial}{\partial \theta} \Lambda_k(\theta_k)$$

denotes a cost gradient for symbol period k, and $\mu$ is a step size for the gradient descent.

In equation (12), $\nabla_\theta \Lambda_k(\theta_k)$ is the gradient or rate of change of the cost function $\Lambda_k(\theta_k)$ with respect to the estimation parameters $\theta_k$. $\Lambda_k(\theta_k)$ and $\nabla_\theta \Lambda_k(\theta_k)$ are vectors having the same dimension as $\theta_k$, which is a 2×1 vector for the first-order predictor. The step size $\mu$ determines the rate of convergence and also affects the stability of the gradient descent as well as noise performance. A larger $\mu$ corresponds to faster convergence, possibly higher probability of non-convergence, and possibly more noise. The converse is true for a smaller $\mu$. The step size $\mu$ may be set to a suitable value, which may be determined based on computer simulations, empirical measurements, etc.

The cost gradient may be determined by taking the partial derivative of $\Lambda_k(\theta_k)$ in equation (10) with respect to $\theta$, as follows:

$$\nabla_\theta \Lambda_k(\theta_k) = -\frac{2}{\gamma_k} \cdot \sum_{l=1}^{k} \lambda^{k-l} \cdot e_l(\theta_l) \cdot \psi_l(\theta_l), \quad \text{Eq (13)}$$

where $$\frac{\partial}{\partial \theta} e_l(\theta_l) = -\frac{\partial}{\partial \theta} y_l(\theta_l)$$

from equation (9), and $$\psi_l(\theta_l) = \frac{\partial}{\partial \theta} y_l(\theta_l)$$

is an error gradient for symbol period l.

The error gradient $\psi_k(\theta_k)$ is the gradient of $y_k(\theta_k)$ and is also the negative of the gradient of $e_k(\theta_k)$.

The cost gradient $\nabla_\theta \Lambda_k(\theta_k)$ in equation (13) may be expressed as:

$$\nabla_\theta \Lambda_k(\theta_k) = -\frac{2}{\gamma_k} \cdot \sum_{l=1}^{k-1} \lambda^{k-l} \cdot e_l^2(\theta_l) \cdot \psi_l(\theta_l) - \frac{2}{\gamma_k} e_k(\theta_k) \cdot \psi_k(\theta_k) \quad \text{Eq (14)}$$
$$= \frac{\gamma_{k-1} \cdot \lambda}{\gamma_k} \cdot \nabla_\theta \Lambda_{k-1}(\theta_{k-1}) - \frac{2}{\gamma_k} e_k(\theta_k) \cdot \psi_k(\theta_k).$$

Equation (14) indicates that the cost gradient for symbol period k is equal to a weighted cost gradient for symbol period k−1 minus the change in the cost gradient from symbol period k−1 to k. The weight $\gamma_{k-1} \cdot \lambda / \gamma_k$ accounts for the weighting used for the cost function in equation (10) and reflected in equation (13).

The cost gradient $\nabla_\theta \Lambda_{k-1}(\theta_{k-1})$ for symbol period k−1 may be assumed to be equal to zero with an optimal θ. This assumption may be expressed as:

$$\nabla_\theta \Lambda_{k-1}(\theta_{k-1})|_{\theta_{k-1}=\theta_{k-1}^{opt}} = 0, \quad \text{Eq (15)}$$

where $\theta_{k-1}^{opt}$ denotes an optimal θ for symbol period k−1.

With the assumption shown in equation (15), the cost gradient in equation (14) may be approximated as follows:

$$\nabla_\theta \Lambda_k(\theta_k) \approx -\frac{2}{\gamma_k} e_k(\theta_k) \cdot \psi_k(\theta_k) \quad \text{Eq (16)}$$
$$\approx -2 \cdot (1-\lambda) \cdot e_k(\theta_k) \cdot \psi_k(\theta_k)$$
for $\theta_k \approx \theta_k^{opt}$.

The approximation in the second line of equation (16) is obtained with $1/\gamma_k \cong (1-\lambda)$ for k≫1. Equation (16) indicates that the cost gradient $\nabla_\theta \Lambda_k(\theta_k)$ is a function of the error gradient $\psi_k(\theta_k)$ as well as the error $e_k(\theta_k)$.

The error gradient $\psi_k(\theta_k)$ may be expressed as:

$$\psi_k(\theta_k) = \frac{\partial}{\partial \theta} \hat{y}_k(\theta_k) \quad \text{Eq (17)}$$
$$= -\frac{\partial}{\partial \theta} e_k(\theta_k)$$
$$= \frac{\partial}{\partial \theta} \hat{s}_k(\theta_k)$$
$$= \frac{\partial}{\partial \theta} [\phi_k(\theta_k) \cdot \theta_k],$$

where the first equality is by definition in equation (13), the second and third equalities result from equation (9), and the fourth equality results from equation (11).

Equation (17) may be expanded as follows:

$$\psi_k(\theta_k) = \frac{\partial}{\partial \theta} [\phi_k(\theta_k) \cdot \theta_k] \quad \text{Eq (18)}$$
$$= \left(\frac{\partial}{\partial \theta} \phi_k(\theta_k)\right) \cdot \theta_k + \phi_k(\theta_k)$$
$$= \left(\frac{\partial}{\partial \theta} [\hat{s}_{k-1} \quad e_{k-1}]\right) \cdot [a_{k-1} \quad L_{k-1}]^T + \phi_k(\theta_k)$$
$$= (a_{k-1} - L_{k-1}) \cdot \frac{\partial}{\partial \theta} \hat{s}_{k-1} + \phi_k(\theta_k)$$
$$= (a_{k-1} - L_{k-1}) \cdot \psi_{k-1}(\theta_{k-1}) + [\hat{s}_{k-1} \quad e_{k-1}]^T.$$

As shown in equation (18), the error gradient $\psi_k(\theta_k)$ for symbol period k may be determined recursively based on the error gradient $\psi_{k-1}(\theta_{k-1})$, the estimation parameters $a_{k-1}$ and $L_{k-1}$, the estimated pilot symbol $\hat{s}_{k-1}$, and the prediction error $e_{k-1}$ for symbol period k−1.

The adaptive channel estimation may be performed as follows. In symbol period k, the predicted pilot symbol $\hat{s}_k$ may be derived as follows:

$$\hat{s}_k = \phi_k(\theta_k) \cdot \theta_k \quad \text{Eq (19)}$$
$$= a_{k-1} \cdot \hat{s}_{k-1} + L_{k-1} \cdot e_{k-1}$$
$$= (a_{k-1} - L_{k-1}) \cdot \hat{s}_{k-1} + L_{k-1} \cdot y_{k-1}$$

where $\phi_k(\theta_k) = [\hat{s}_{k-1} e_{k-1}]$ and $\theta_k = [a_{k-1} L_{k-1}]^T$. Equation (19) indicates that the predicted pilot symbol $\hat{s}_k$ may be derived based on the predicted pilot symbol $\hat{s}_{k-1}$, the estimation parameters $a_{k-1}$ and $L_{k-1}$, and the received pilot symbol $y_{k-1}$ for prior symbol period k−1.

The prediction error $e_k$ may be derived as follows:

$$e_k = y_k - \hat{s}_k. \quad \text{Eq (20)}$$

The error gradient may then be updated as follows:

$$\psi_k(\theta_k) = (a_{k-1} - L_{k-1}) \cdot \psi_{k-1}(\theta_{k-1}) + [\hat{s}_{k-1} e_{k-1}]^T. \quad \text{Eq (21)}$$

Temporary estimation parameters may be computed as follows:

$$\theta_{k+1}^{temp} = \theta_k + 2 \cdot \mu \cdot (1-\lambda) \cdot e_k \cdot \psi_k(\theta_k). \quad \text{Eq (22)}$$

where $\theta_{k+1}^{temp} = [a_k^{temp} L_k^{temp}]^T$ is a vector of temporary estimation parameters.

The estimation parameters may be updated based on the temporary estimation parameters, as follows:

$$\theta_{k+1} = \begin{cases} \theta_{k+1}^{temp} & \text{if } |a_k^{temp} - L_k^{temp}| < 1 \\ \theta_k & \text{otherwise} \end{cases} \quad \text{Eq (23)}$$

where $|a_k^{temp} - L_k^{temp}| < 1$ is a stability criterion/test used to ensure stability in the updating of the estimation parameters. Other stability criteria may also be used.

The predicted pilot symbol $\hat{s}_k$ may be used as a channel estimate for symbol period k. The predicted pilot symbol $\hat{s}_k$ includes the known transmitted pilot symbol $s_k$ as well as the channel response. The channel estimate may be used for maximal ratio combining, equalization, matched filtering, data detection, etc.

A corrector is a predicted pilot symbol for the next symbol period k+1 and may be derived as follows:

$$\hat{s}_{k+1}^+ = \hat{s}_k + L_k \cdot e_k / a_k, \qquad \text{Eq (24)}$$

where $\hat{s}_{k+1}^+$ is a corrector for symbol period k+1. The corrector may be used as a channel estimate for the next symbol period k+1.

Figure 3:
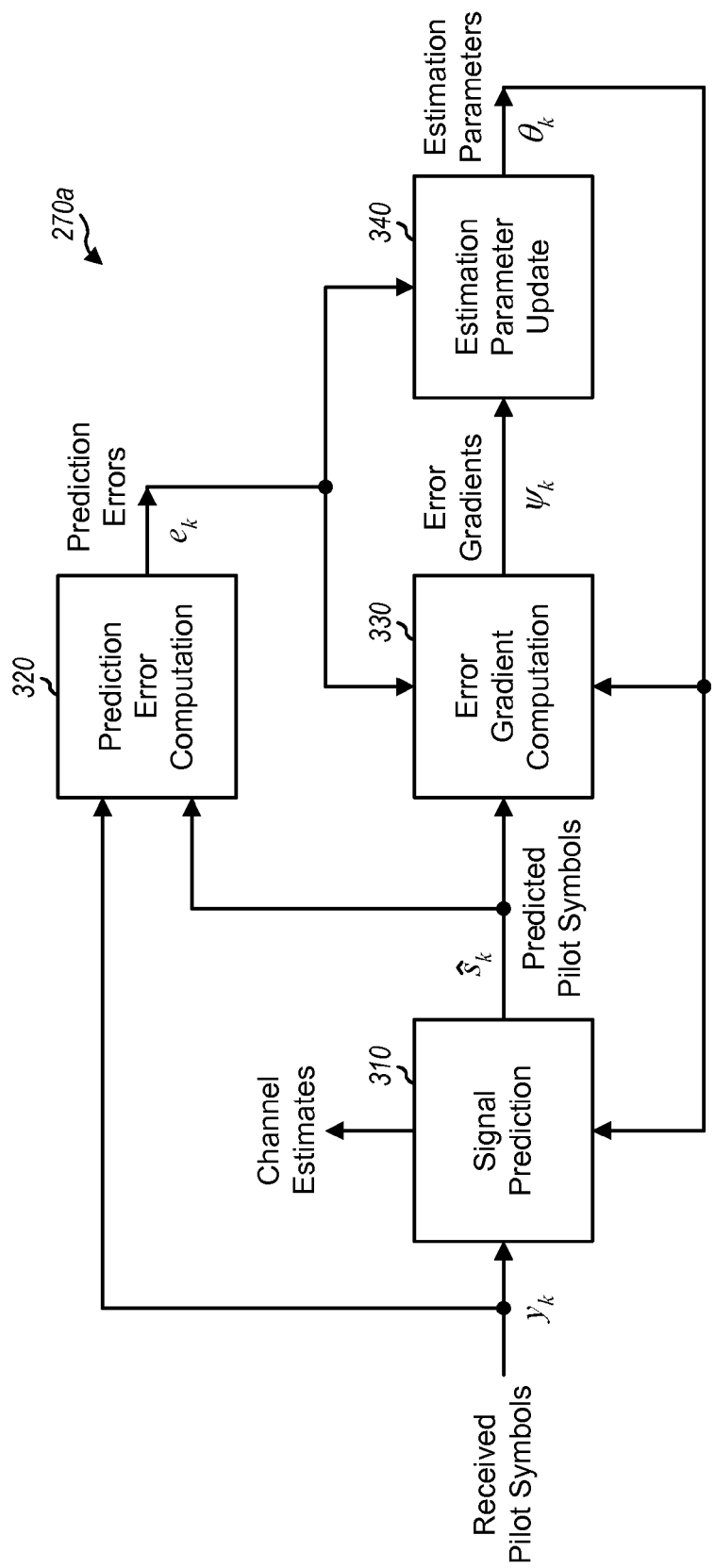
FIG. 3 shows a block diagram of an adaptive channel estimator.

FIG. 3 shows a block diagram of an adaptive channel estimator 270a, which is one design of adaptive channel estimator 270 in FIG. 2. Within adaptive channel estimator 270a, a signal prediction unit 310 obtains the received pilot symbol $y_k$ and the estimation parameters $\theta_k$ and derives the predicted pilot symbol $\hat{s}_k$, e.g., as shown in equation (19). A prediction error computation unit 320 obtains the received pilot symbol $y_k$ and the predicted pilot symbol $\hat{s}_k$ and determines the prediction error $e_k$, e.g., as shown in equation (20). An error gradient computation unit 330 receives the prediction error $e_k$, the predicted pilot symbol $\hat{s}_k$, and the estimation parameters $\theta_k$ and determines the error gradient $\psi_k(\theta_k)$, e.g., as shown in equation (21). An estimation parameter update unit 340 receives the prediction error $e_k$ and the error gradient $\psi_k(\theta_k)$ and updates the estimation parameters $\theta_k$, e.g., as shown in equations (22) and (23). Signal prediction unit 310 may provide the predicted pilot symbol $\hat{s}_k$ as a channel estimate or may derive the channel estimate based on the estimation parameters $\theta_k$, the predicted pilot symbol $\hat{s}_k$, and the prediction error $e_k$, e.g., as shown in equation (24).

In general, estimation parameter $a_k$ and/or $L_k$ may be adaptively updated as described above. In one design, $a_k$ is fixed to one, or $a_k = 1$, and $L_k$ is adaptively updated. Equations (19) through (23) may then be expressed as:

$$\hat{s}_k = (1 - L_{k-1}) \cdot \hat{s}_{k-1} + L_{k-1} \cdot y_{k-1}, \qquad \text{Eq (25)}$$

$$e_k = y_k - \hat{s}_k, \qquad \text{Eq (26)}$$

$$\psi_k(\theta_k) = (1 - L_{k-1}) \cdot \psi_{k-1}(\theta_{k-1}) + e_{k-1}, \qquad \text{Eq (27)}$$

$$L_k^{temp} = L_{k-1} + 2 \cdot \mu \cdot (1 - \lambda) \cdot e_k \cdot \psi_k(\theta_k), \text{ and} \qquad \text{Eq (28)}$$

$$L_k = \begin{cases} L_k^{temp} & \text{if } |1 - L_k^{temp}| < 1 \\ L_{k-1} & \text{otherwise.} \end{cases} \qquad \text{Eq (29)}$$

When only one estimation parameter is updated, the error gradient $\psi_k(\theta_k)$ is a scalar (instead of a vector). Only the prediction error $e_{k-1}$ (and not the predicted pilot symbol $\hat{s}_{k-1}$) is used to update the error gradient. With $a_k = 1$, the recursive equation (26) for the predicted pilot symbol is a single-pole IIR filter with a pole at $(1 - L_{k-1})$. The pole adaptively tracks varying channel conditions.

Figure 4:
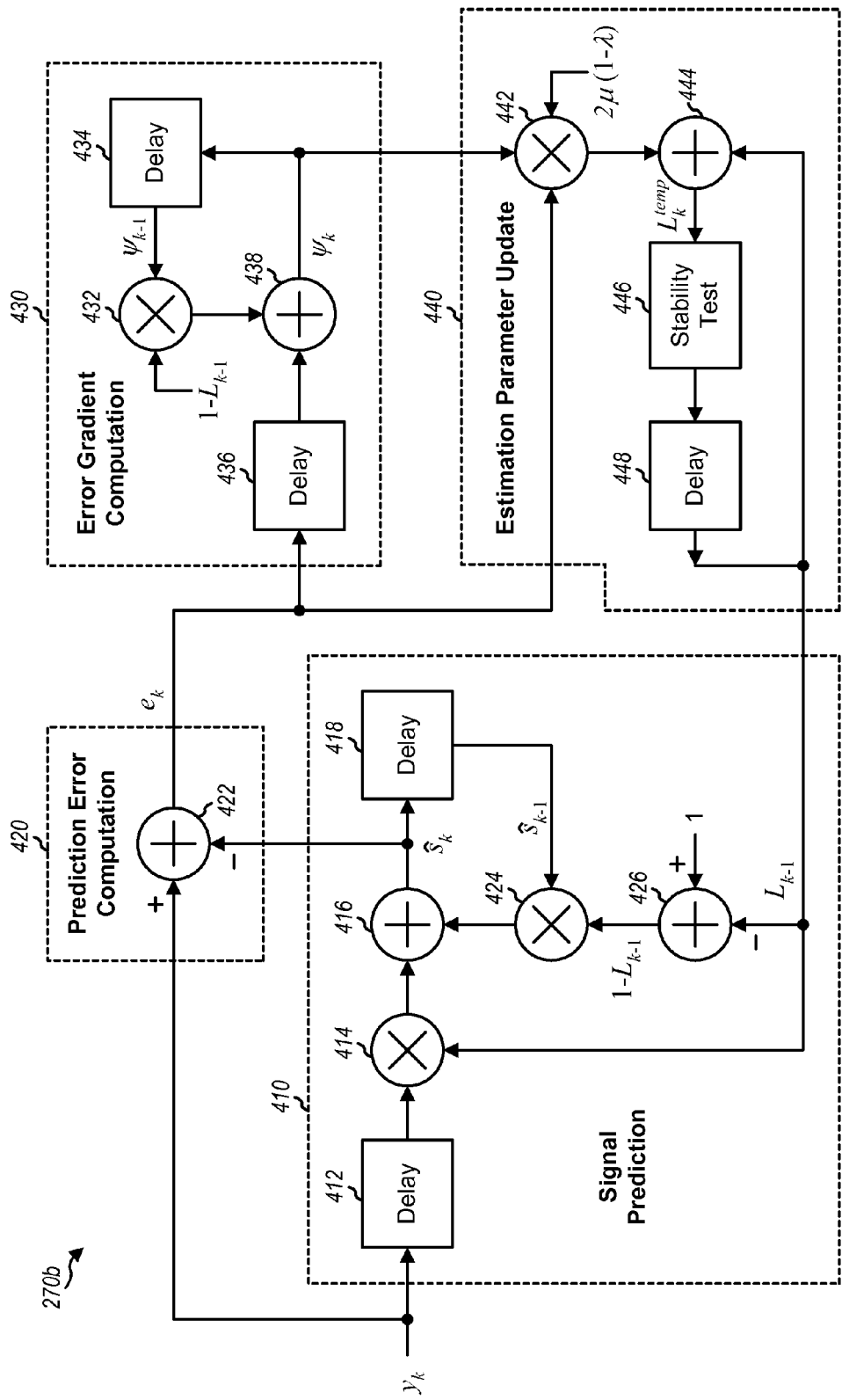
FIG. 4 shows a block diagram of another adaptive channel estimator.

FIG. 4 shows a block diagram of an adaptive channel estimator 270b that implements equations (26) through (30) and is another design of channel estimator 270 in FIG. 2. Adaptive channel estimator 270b includes a signal prediction unit 410, a prediction error computation unit 420, an error gradient computation unit 330, and a estimation parameter update unit 440.

Within signal prediction unit 410, a delay unit 412 delays the received pilot symbol $y_k$ by one symbol period. A multiplier 414 multiplies the output $y_{k-1}$ of delay unit 412 with the estimation parameter $L_{k-1}$. A summer 426 subtracts $L_{k-1}$ from 1 and provides $(1 - L_{k-1})$ to a multiplier 424. Multiplier 424 multiplies predicted pilot symbol $\hat{s}_{k-1}$ from a delay unit 418 with $(1 - L_{k-1})$. A summer 416 sums the outputs of multipliers 414 and 424 and provides predicted pilot symbol $\hat{s}_k$ to delay unit 418.

Within prediction error computation unit 420, a summer 422 subtracts the predicted pilot symbol $\hat{s}_k$ from the received pilot symbol $y_k$ and provides the prediction error $e_k$. Within error gradient computation unit 430, a multiplier 432 multiplies the error gradient $\psi_{k-1}(\theta_{k-1})$ from a delay unit 434 with $(1 - L_{k-1})$. A delay unit 436 delays the prediction error $e_k$ by one symbol period. A summer 438 sums the delayed prediction error $e_{k-1}$ with the output of multiplier 432 and provides the updated error gradient $\psi_k(\theta_k)$ to delay unit 434. Within estimation parameter update unit 440, a multiplier 442 multiplies the prediction error $e_k$ with $2 \cdot \mu \cdot (1 - \lambda)$ as well as the error gradient $\psi_k(\theta_k)$. A summer 444 sums the output of multiplier 442 with the estimation parameter $L_{k-1}$ from a delay unit 448 and provides a temporary estimation parameter $L_k^{temp}$. A unit 446 performs a stability test on $L_k^{temp}$, e.g., as shown in equation (30), and provides $L_k^{temp}$ to delay unit 448 if the stability test is satisfied.

For clarity, the adaptive estimation techniques have been described for pilot symbols. The techniques may also be used to estimate data symbols. In general, for the description above, the received pilot symbols may be replaced with received symbols, which may comprise received data symbols, received pilot symbols, received signaling symbols, etc.

Also for clarity, a first-order predictor has been described above. The adaptive channel estimation may be performed with a higher order predictor. The number of estimation parameters may be dependent on the order of the predictor.

Figures 5, 6:
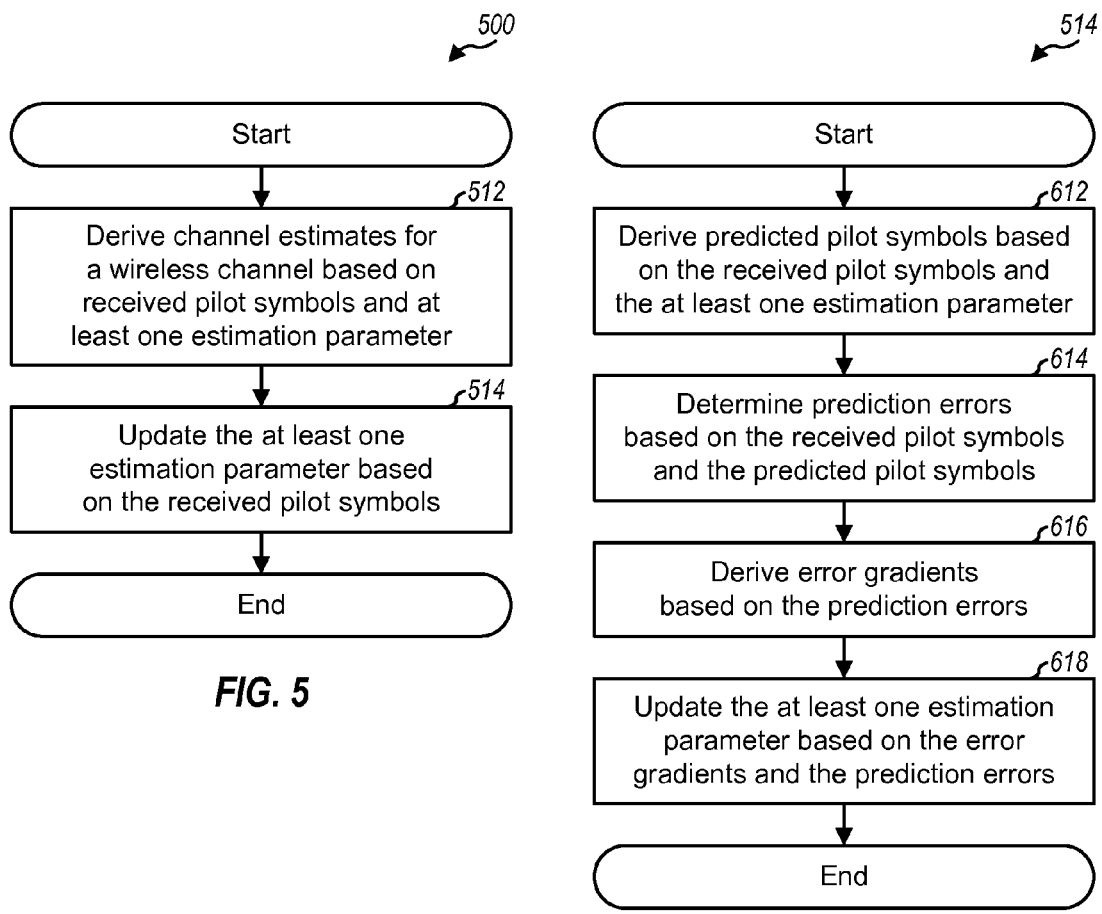
FIG. 5 shows a process for performing adaptive channel estimation.
FIG. 6 shows a process for updating at least one estimation parameter.

FIG. 5 shows a process 500 for performing adaptive channel estimation. Channel estimates for a wireless channel are derived based on received pilot symbols and at least one estimation parameter (block 512). The at least one estimation parameter is updated based on the received pilot symbols (block 514). The at least one estimation parameter may be for an innovations representation (IR) model of the wireless channel and may be updated based on a cost function with costs defined by prediction errors. The cost function may give exponentially decaying weights to costs for progressively older symbol periods. The at least one estimation parameter may be updated using gradient descent, e.g., based on the gradient of the cost function.

FIG. 6 shows a design of block 514 for updating the at least one estimation parameter. Predicted pilot symbols are derived based on the received pilot symbols and the at least one estimation parameter, e.g., as shown in equation (19) or (26) (block 612). The at least one estimation parameter may comprise a single estimation parameter. In this case, the received pilot symbols may be filtered with an IIR filter having a response determined by the single estimation parameter to obtain the predicted pilot symbols, e.g., as shown in equation (20) or (27). Prediction errors are determined based on the received pilot symbols and the predicted pilot symbols (block 614). Error gradients are derived based on the prediction errors (block 616). For example, an error gradient for the current symbol period may be recursively derived based on an error gradient for the preceding symbol period, e.g., as shown in equation (21) or (28). The at least one estimation parameter is then updated based on the error gradients and the prediction errors (block 618). For example, the at least one estimation parameter for the current symbol period may be recursively updated based on the at least one estimation parameter for the preceding symbol period, e.g., as shown in equation (22) or (29). At least one temporary estimation parameter may be derived, and the at least one estimation parameter may be updated with the at least one temporary estimation parameter if a stability criterion is satisfied, e.g., as shown in equation (23) or (30).

The predicted pilot symbols obtained in block 612 may be provided as the channel estimates in block 512. Alternatively or additionally, the channel estimates may be derived based on the predicted pilot symbols and the at least one estimation parameter, e.g., as shown in equation (24) or (25).

The adaptive estimation techniques described herein may be implemented by various means. For example, these techniques may be implemented in hardware, firmware, software, or a combination thereof. For a hardware implementation, the processing units used to perform adaptive estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, and so on) that perform the functions described herein. The firmware and/or software codes may be stored in a memory (e.g., memory 292 in FIG. 2) and executed by a processor (e.g., processor 290). The memory may be implemented within the processor or external to the processor. The firmware and/or software may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
   a processor configured to derive channel estimates for a wireless channel based on received pilot symbols and a single estimation parameter, and to update the single estimation parameter based on the received pilot symbols, wherein the single estimation parameter is for an innovations representation model of the wireless channel; and
   a memory coupled to the processor, wherein the processor is configured to derive predicted pilot symbols based on the received pilot symbols and the single estimation parameter, to determine prediction errors based on the received pilot symbols and the predicted pilot symbols, and to update the single estimation parameter based on the prediction errors,
   wherein the processor is configured to derive an error gradient for a current symbol period based on an error gradient for a preceding symbol period, and
   wherein the processor is configured to update the single estimation parameter for a current symbol period based on the single estimation parameter for a preceding symbol period.

2. The apparatus of claim 1, wherein the processor is configured to provide the predicted pilot symbols as the channel estimates.

3. The apparatus of claim 1, wherein the processor is configured to derive the channel estimates based on the predicted pilot symbols and the single estimation parameter.

4. The apparatus of claim 1, wherein the processor is configured to update the single estimation parameter based on a cost function with costs defined by the prediction errors.

5. The apparatus of claim 4, wherein the cost function gives exponentially decaying weights to costs for progressively older symbol periods.

6. The apparatus of claim 1, wherein the processor is configured to derive error gradients based on the prediction errors and to update the single estimation parameter based on the error gradients and the prediction errors.

7. The apparatus of claim 1, wherein the processor is configured to filter the received pilot symbols with an infinite impulses response (IIR) filter having a response determined by the single estimation parameter to obtain the predicted pilot symbols.

8. The apparatus of claim 1, wherein the processor is configured to derive a single temporary estimation parameter for a next symbol period based on the received pilot symbols, and to update the single estimation parameter with the single temporary estimation parameter if a stability criterion is satisfied.

9. The apparatus of claim 1, wherein the processor is configured to update the single estimation parameter using gradient descent.

10. The apparatus of claim 9, wherein the processor is configured to update the single estimation parameter based on gradient of the cost function.

11. An apparatus comprising:
    a processor configured to derive data symbol estimates based on received data symbols and a single estimation parameter and to update the single estimation parameter based on the received data symbols, wherein the single estimation parameter is for an innovations representation model of the wireless channel; and
    a memory coupled to the processor, wherein the processor is configured to derive predicted data symbols based on the received data symbols and the single estimation parameter, to determine prediction errors based on the received data symbols and the predicted data symbols, and to update the single estimation parameter based on the prediction errors,
    wherein the processor is configured to derive an error gradient for a current symbol period based on an error gradient for a preceding symbol period, and
    wherein the processor is configured to update the single estimation parameter for a current symbol period based on the single estimation parameter for a preceding symbol period.

12. The apparatus of claim 11, wherein the processor is configured to derive predicted data symbols based on the received data symbols and the single estimation parameter, to determine prediction errors based on the received data symbols and the predicted data symbols, to derive error gradients based on the prediction errors, and to update the single estimation parameter based on the error gradients and the prediction errors.

13. A method comprising:
deriving channel estimates for a wireless channel based on received pilot symbols and a single estimation parameter, wherein the single estimation parameter is for an innovations representation model of the wireless channel; and
a processor for updating the single estimation parameter based on the received pilot symbols,
wherein the updating the single estimation parameter comprises
deriving predicted pilot symbols based on the received pilot symbols and the single estimation parameter,
determining prediction errors based on the received pilot symbols and the predicted pilot symbols,
deriving error gradients based on the prediction errors, and
using the processor for updating the single estimation parameter based on the error gradients and the prediction errors,
wherein the deriving the error gradients comprises deriving an error gradient for a current symbol period based on an error gradient for a preceding symbol period, and wherein the processor updates the single estimation parameter by updating the single estimation parameter for the current symbol period based on the single estimation parameter for the preceding symbol period.

14. The method of claim 13, wherein the processor updates the single estimation parameter by updating the single estimation parameter based on gradient of a cost function with costs defined by prediction errors.

15. An apparatus comprising:
means for deriving channel estimates for a wireless channel based on received pilot symbols and a single estimation parameter, wherein the single estimation parameter is for an innovations representation model of the wireless channel; and
means for updating the single estimation parameter based on the received pilot symbols, wherein the means for updating the single estimation parameter comprises
means for deriving predicted pilot symbols based on the received pilot symbols and the single estimation parameter,
means for determining prediction errors based on the received pilot symbols and the predicted pilot symbols,
means for deriving error gradients based on the prediction errors,
means for updating the single estimation parameter based on the error gradients and the prediction errors, and
wherein the means for deriving the error gradients comprises means for deriving an error gradient for a current symbol period based on an error gradient for a preceding symbol period, and wherein the means for updating the single estimation parameter comprises means for updating the single estimation parameter for the current symbol period based on the single estimation parameter for the preceding symbol period.

16. The apparatus of claim 15, wherein the means for updating the single estimation parameter comprises means for updating the single estimation parameter based on gradient of a cost function with costs defined by prediction errors.

17. A processor readable media for storing instructions to:
derive channel estimates for a wireless channel based on received pilot symbols and a single estimation parameter, wherein the single estimation parameter is for an innovations representation model of the wireless channel,
update the single estimation parameter based on the received pilot symbols,
derive predicted pilot symbols based on the received pilot symbols and the single estimation parameter,
determine prediction errors based on the received pilot symbols and the predicted pilot symbols,
derive error gradients based on the prediction errors,
update the single estimation parameter based on the error gradients and the prediction errors,
derive an error gradient for a current symbol period based on an error gradient for a preceding symbol period, and
update the single estimation parameter for the current symbol period based on the single estimation parameter for the preceding symbol period.

18. The processor readable media of claim 17, and further for storing instructions to:
update the single estimation parameter based on gradient of a cost function with costs defined by prediction errors.

* * * * *